United States Patent [19]

Liu

[11] Patent Number: 4,957,388
[45] Date of Patent: Sep. 18, 1990

[54] BICYCLE FRAME TUBE NEW COUPLING STRUCTURE

[76] Inventor: Chin-Lang Liu, No. 20, 7th Rd., Industrial Park, Taichung, Taiwan

[21] Appl. No.: 350,282

[22] Filed: May 11, 1989

[51] Int. Cl.$^5$ .............................................. B60B 27/06
[52] U.S. Cl. ..................................... 403/344; 403/290; 403/272
[58] Field of Search ................. 403/290, 344, 313, 272

[56] References Cited

U.S. PATENT DOCUMENTS

| | | | |
|---|---|---|---|
| 279,575 | 6/1883 | Leaycraft | 403/313 X |
| 669,389 | 3/1901 | Gundry | 403/290 X |
| 1,709,825 | 4/1929 | Austin | 403/290 X |
| 4,469,465 | 9/1984 | Andrus | 403/313 X |
| 4,753,462 | 6/1988 | Liu | 403/344 X |
| 4,772,153 | 9/1988 | Huang | 403/344 |

Primary Examiner—Andrew V. Kundrat
Attorney, Agent, or Firm—Varndell Legal Group

[57] ABSTRACT

The present invention is related to a new bicycle frame tube coupling structure and, more particularly, to a tight coupling which includes a pair of solid lugs having large curved front edges fixedly connected to the wall surface of the tight coupling through a silver brazing process. When a locking bolt is inserted through the pair of lugs and screwed tight, the solid body of the two opposite lugs and the two large curved surfaces provide an increased pressure onto a fixed tube to firmly tighten a movable tube, which is contained in the fixed tube and both of which are set in the tight coupling, so that the movable tube be firmly positioned therein.

1 Claim, 3 Drawing Sheets

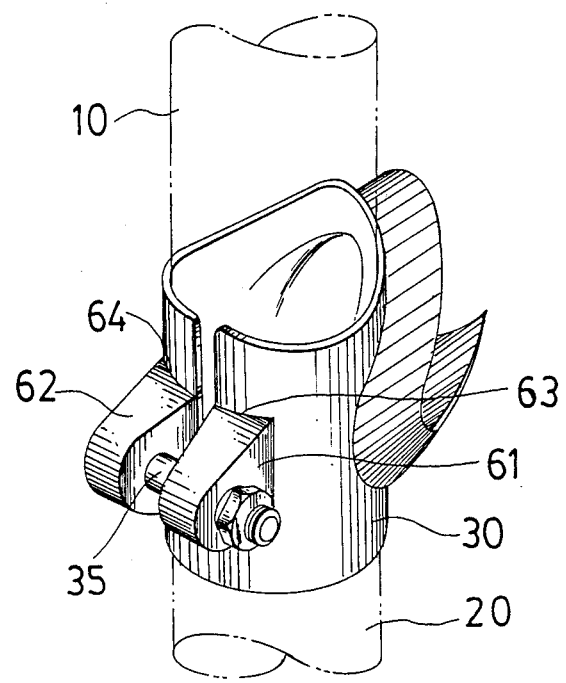
Fig. 3-1
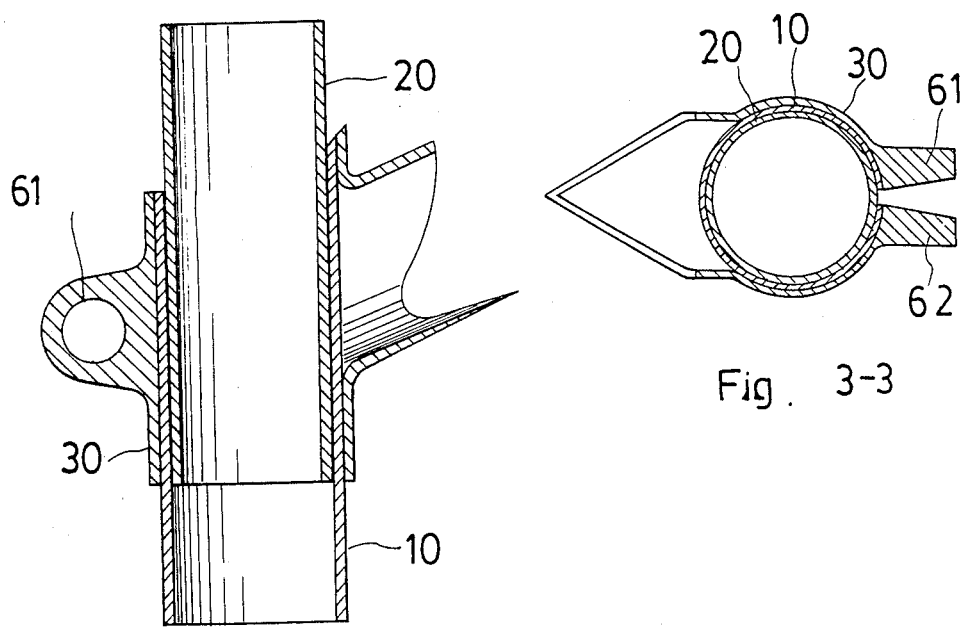
Fig. 3-2
Fig. 3-3

BICYCLE FRAME TUBE NEW COUPLING STRUCTURE

BACKGROUND AND SUMMARY OF THE INVENTION

The present invention relates to a new bicycle frame tube coupling structure and, more particularly, to a tight coupling which provides a maximized tightening strength for clamping a movable tube set therein without damaging the movable tube and which protects the coupling structure itself against distortion during use.

In a bicycle, a seat stay is adjustably inserted into the rear fork of the bicycle frame and firmly retained therein by means of the tight coupling of the rear fork, so as to support the seat saddle and adjust its elevation.

FIG. 1 shows a common method to position a core tube in a conventional bicycle. As shown in the drawing, a core tube assembly includes a fixed tube set in a tight coupling for retaining a movable tube therein. The fixed tube has an elongated notch transversely made therein piercing its front end, and the tight coupling is cut off at one side to define an elongated opening which is aimed at the elongated notch of the fixed tube when the fixed tube is fixedly set thereinside through welding process. The tight coupling has one pair of symmetric and recessed lugs oppositely disposed for inserting a locking bolt therethrough. A locknut is arranged on the end of the locking bolt so that the coupling can be tightened, thereby forcing the fixed tube to firmly retain the movable tube. In order to reinforce the tightening effect of the tight coupling on the movable tube via the fixed tube, a pressure plate (as shown in FIG. 2-3) is respectively set in the recess of each of the pair of lugs to reinforce the strength of the lugs and to increase the direct pressure onto the fixed tube. The use of such pressure plates is as illustrated in FIGS. 2-1, 2-2 and 2-3. FIG. 2-1 is a vertical sectional assembly view of the said core tube assembly, and FIG. 2-2 is a cross sectional view. The pressure plate, as shown in FIG. 2-3, has an U-shaped configuration and is set in the recess of the associated lug with both ends stopped against the outer wall of the fixed tube. When the locking bolt is tightened the two opposite lugs close inward and the respective pressure plates are forced to press on the fixed tube, so that the elongated notch is closed inward the movable tube is firmly retained. Thus, the movable tube can be firmly positioned. According to this movable tube positioning method, the two opposite lugs are not reinforced in structure. In practice, the two opposite lugs tend to become distorted after a very short period of use, which deteriorates the strength of the tight coupling. Accordingly, the ability of the tight coupling to position and hold the movable tube deteriorates.

The main object of the present invention is to provide a new bicycle frame tube coupling structure which provides better tightening effect, protects the tight coupling against distortion, and guarantees maximum stability and security in operation.

Another object of the present invention is to provide a new bicycle frame tube coupling structure which is easy and more inexpensive to manufacture.

The above and other objects, features and advantages of the present invention will be fully understood from the following detailed description of the preferred embodiment considered in connection with the annexed drawings as hereunder.

BRIEF DESCRIPTION OF THE DRAWINGS

FIG. 2-1 is a vertical sectional view of the prior art.

FIG. 2-2 is a cross sectional view of the prior art.

FIG. 2-3 is a perspective view of a pressure plate used in the prior art.

FIG. 3-1 is a perspective assembly view of the present invention.

FIG. 3-2 is a vertical sectional assembly view of the present invention.

FIG. 3-3 is a cross sectional view of the present invention.

DETAILED DESCRIPTION OF THE PREFERRED EMBODIMENT

Figure 1:
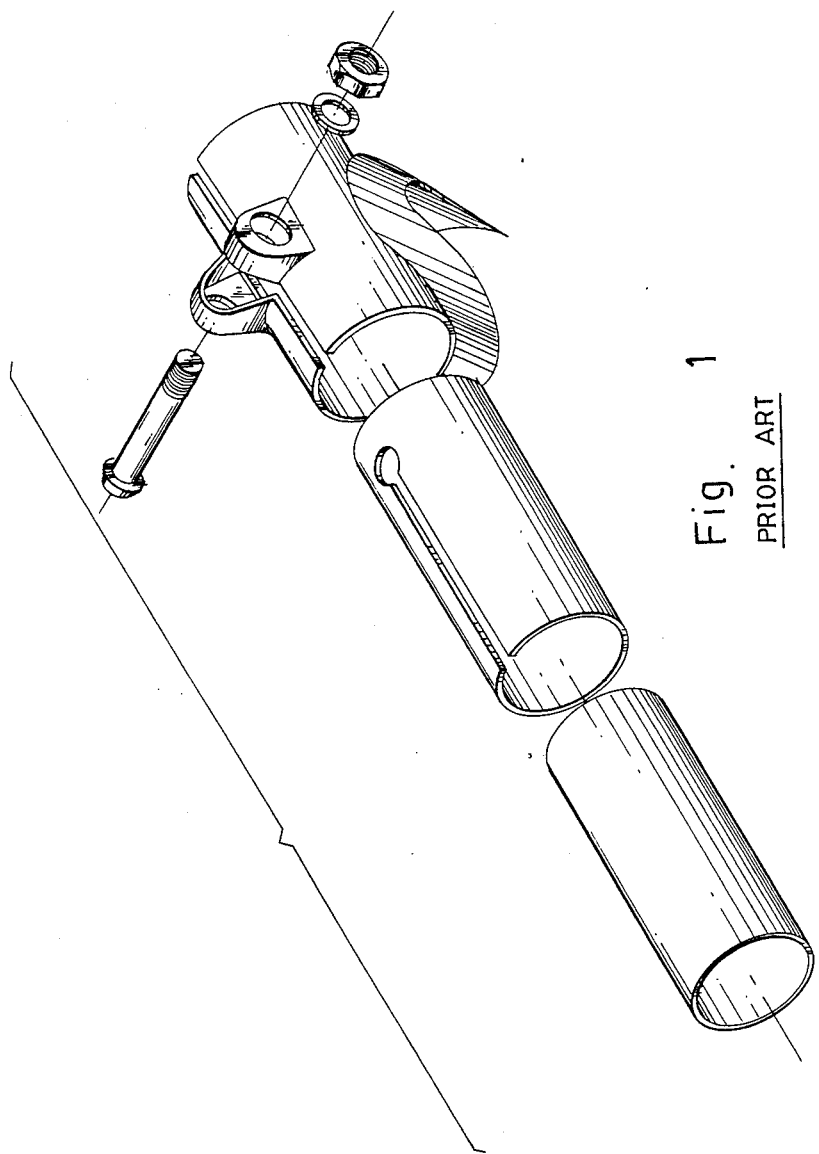
FIG. 1 is a perspective fragmentary view of a core sleeve and tight coupling assembly.
Figures 1, 2:
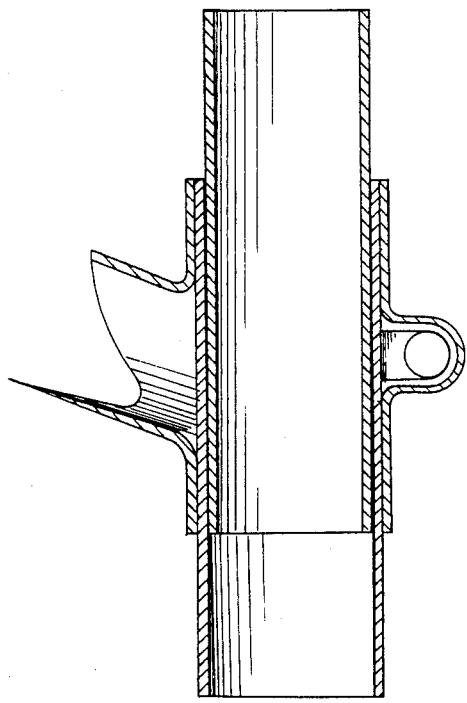
Figures 2, 3:
Figure 2:
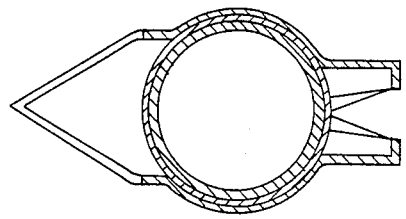

Referring to FIGS. 1, 3-1, 3-2 and 3-3, a tight coupling 30 includes a pair of solid lugs 61 and 62 having large and curved front edges 63 and 64 fixedly connected to the wall surface of the tight coupling 30 through a silver brazing process, such that when locking bolt 35 is screwed tight, the solid body of the two opposite lugs 61 and 62 and the two large curved surfaces 63 and 64 provide an increased pressure onto the fixed tube 10 to firmly tighten the movable tube 20, so that the movable tube 20 is firmly positioned therein.

According to the design of the present invention, the structure can provide following advantages:

(1) The solid structure of the two opposite lugs allows the lugs to tightly connect with the wall surface of the coupling, so as to provide maximized strength, when the locking bolt is screwed tight, to further force the inner wall surface of the tight coupling to hold up the fixed tube through a larger contact area, and to protect the two opposite lugs 61 and 62 against torsional force.

(2) The solid lugs 61 and 62 are produced through a single manufacturing process and are connected to the tight coupling through a silver blazing process. Therefore, mass production is possible and manufacturing cost is drastically reduced.

(3) The tight coupling 30 presses on the fixed tube 10 with a larger area so as to increase the torque force and guarantee maximum safety.

In conclusion, as described above, the present invention provides a new coupling structure for a bicycle frame tube, which has numerous features each of which tends to make the structure more practical in performance, and more durable and safe in use.

I claim:

1. A bicycle frame tight coupling comprising a first tubular member having a slit along its longitudinal axis, a second tubular member axially movable and rotatable within said first tubular member, and a pair of solid lugs cooperating with a locking bolt and locking nut for tightening said first tubular member about said second tubular member and prohibiting movement therebetween, said solid lugs having large and curved front edges matching a curvature on the first tubular member and fastened to said first tubular member respectively on opposite sides of said slit by a silver brazing process, each of said solid lugs having flat side surfaces including an outer flat surface spaced from said longitudinal slit and an inner flat surface arranged directly at an edge of said longitudinal slit, said solid lugs forming a V-shaped space therebetween by said inner flat surfaces with a base of said V-shaped space located at said longitudinal slit, each of said solid lugs having hole for receiving said locking bolt arranged at a distance from said first tubular member, said locking nut tightening on said locking bolt and holding said second tubular member within said first tubular member by torque created directly beneath and around said front edges of said solid lugs.

* * * * *